US010926283B2

(12) United States Patent
Jordan

(10) Patent No.: US 10,926,283 B2
(45) Date of Patent: Feb. 23, 2021

(54) FINGERTIP MIST

(71) Applicant: Carolyn S. Jordan, Henderson, TX (US)

(72) Inventor: Carolyn S. Jordan, Henderson, TX (US)

( * ) Notice: Subject to any disclaimer, the term of this patent is extended or adjusted under 35 U.S.C. 154(b) by 179 days.

(21) Appl. No.: 15/833,621

(22) Filed: Dec. 6, 2017

(65) Prior Publication Data

US 2018/0297046 A1 Oct. 18, 2018

Related U.S. Application Data

(60) Provisional application No. 62/602,116, filed on Apr. 12, 2017.

(51) Int. Cl.
*B05B 12/12* (2006.01)
*B05B 9/04* (2006.01)
(Continued)

(52) U.S. Cl.
CPC ............ *B05B 12/122* (2013.01); *A01N 25/02* (2013.01); *A01N 31/02* (2013.01); *B05B 9/0403* (2013.01);
(Continued)

(58) Field of Classification Search
CPC ......... B05B 1/14; B05B 7/247; B05B 9/0403; B05B 9/0426; B05B 12/002; B05B 12/122; B05B 17/00; B05B 17/04; B65D 51/002
See application file for complete search history.

(56) References Cited

U.S. PATENT DOCUMENTS 398,528 A 2/1889 Molin
1,019,111 A 3/1912 Wright
(Continued)

FOREIGN PATENT DOCUMENTS

CN 2117268 U 9/1992
CN 201275969 Y 7/2009
(Continued)

OTHER PUBLICATIONS

Webstaurantestore; Interplast Group NP14X18MM Fresh 4 You 14" x 18" Natural Translucent Narrow Profile Plastic Produce Bag with More Matters Graphic—3000/Case; retrieved Dec. 4, 2017; https://www.webstaurantstore.com/inteplast-group-np14x18mm-fresh-4-you-14-x-18-natural-translucent-narrow-profile-plastic-produce-bag-with-more-matters-graphic-3000-case/130PBN1418MM.html; WebstaurantStore Food Service Equipment and Supply Company; US.

(Continued)

*Primary Examiner* — Ryan A Reis
(74) *Attorney, Agent, or Firm* — Kirby Drake

(57) ABSTRACT

A clean, sterile fingertip mist of simulated saliva of appropriate droplet size and quantity is provided to allow consumers to easily moisten their fingertips to open produce bags, to count money, separate papers and for other applications where moist fingertips are useful. The simulated saliva provided substitutes for natural saliva to avoid spread of 'germs' such as virus, bacterium, bacillus and other microbes and microorganisms, and other undesirables found in natural human saliva. A misting apparatus is provided, being tailored for delivery of a fine range, having distributed, but limited, quantity of droplets of sterile simulated saliva. This invention avoids consumers passing germs by using their own germ laden saliva to moisten fingertips then open produce bags, county money, separate papers and the
(Continued)

like. In one embodiment, a method of layer separation by use specific sterile simulated saliva and mist dispenser therefor are provided in lieu of actions such as (i) licking fingertips, (ii) applying oily lotions or thick globs of hand sanitizer (iii) wearing gloves or (iv) intense, repetitive rubbing for friction separation.

8 Claims, 2 Drawing Sheets

(51) Int. Cl.
| | |
|---|---|
| B05B 12/00 | (2018.01) |
| A01N 31/02 | (2006.01) |
| B65D 51/00 | (2006.01) |
| A01N 25/02 | (2006.01) |
| B43M 11/04 | (2006.01) |
| B05B 1/14 | (2006.01) |
| A47F 9/04 | (2006.01) |

(52) U.S. Cl.
CPC ........... *B05B 12/002* (2013.01); *B43M 11/04* (2013.01); *B65D 51/002* (2013.01); *A47F 2009/041* (2013.01); *B05B 1/14* (2013.01)

(56) References Cited

U.S. PATENT DOCUMENTS

| | | | |
|---|---|---|---|
| 2,208,006 | A | 6/1940 | Lane |
| 2,331,117 | A | 10/1941 | Goodhue |
| 2,413,652 | A | 12/1946 | Pollock |
| 2,444,160 | A | 6/1948 | Gordon |
| 2,554,302 | A | 5/1951 | Keskitalo |
| 2,699,780 | A | 1/1955 | Rudnick et al. |
| 2,751,127 | A | 6/1956 | Horald |
| 3,390,940 | A | 7/1968 | Schwartzman |
| 3,819,921 | A | 6/1974 | Kilby et al. |
| 4,879,281 | A | 11/1989 | Shibasaki et al. |
| 5,397,028 | A * | 3/1995 | Jesadanont .......... A47K 5/1217 222/1 |
| 5,433,782 | A | 7/1995 | Fillbert |
| 5,492,247 | A | 2/1996 | Shu et al. |
| 5,541,165 | A | 7/1996 | Turgeon |
| 6,152,634 | A | 11/2000 | Kim |
| 6,215,399 | B1 | 4/2001 | Shpater |
| 6,386,390 | B1 | 5/2002 | Tinker |
| 6,495,612 | B1 | 12/2002 | Corzani et al. |
| 6,626,332 | B2 * | 9/2003 | Ehrensperger .......... A47K 5/14 222/1 |
| 6,685,376 | B2 | 2/2004 | Weihrauch |
| D530,125 | S | 10/2006 | Vignot |
| 8,308,027 | B2 | 11/2012 | Law et al. |
| 8,562,907 | B2 | 10/2013 | Green |
| 8,783,511 | B2 * | 7/2014 | Snodgrass .......... A47K 5/1202 222/52 |
| 8,878,663 | B2 | 11/2014 | Katiba et al. |
| 8,950,730 | B2 | 2/2015 | Bedolla |
| 8,975,819 | B2 | 3/2015 | Lemmers |
| 9,264,383 | B1 | 2/2016 | Dropps |
| 9,265,383 | B2 * | 2/2016 | Yang .................... B05B 12/122 |
| 9,408,412 | B2 | 8/2016 | McDonald |
| 9,531,420 | B1 | 12/2016 | Pendergast |
| 9,728,827 | B2 | 8/2017 | Miyazawa et al. |
| 9,763,546 | B2 | 9/2017 | Yang |
| 9,777,957 | B1 | 10/2017 | Des Champ |
| 2002/0094225 | A1 | 7/2002 | Gueret |
| 2003/0202838 | A1 | 10/2003 | Li |
| 2004/0132977 | A1 | 7/2004 | Gantier |
| 2004/0140430 | A1 | 7/2004 | Micko |
| 2004/0226962 | A1 * | 11/2004 | Mazursky .......... A47K 5/1217 222/95 |
| 2005/0202438 | A1 | 9/2005 | Gantier |
| 2007/0000941 | A1 | 1/2007 | Gadriel |
| 2007/0199952 | A1 * | 8/2007 | Carpenter ............ B05B 12/122 222/52 |
| 2008/0273915 | A1 * | 11/2008 | O'Connell ........... B05C 17/002 401/188 R |
| 2009/0020135 | A1 * | 1/2009 | Adams .................... B08B 3/026 134/1 |
| 2010/0136409 | A1 | 6/2010 | Ferber |
| 2012/0012478 | A1 | 1/2012 | Berman |
| 2013/0334248 | A1 | 12/2013 | Hardman et al. |
| 2015/0061988 | A1 | 3/2015 | Galu |
| 2015/0231293 | A1 * | 8/2015 | Zaghi .................... B05B 12/122 422/28 |
| 2016/0303598 | A1 * | 10/2016 | Rifkin .................... B05B 9/002 |
| 2017/0055104 | A1 | 2/2017 | Wegelin et al. |
| 2017/0139431 | A1 | 5/2017 | Carlson |
| 2017/0235013 | A1 | 8/2017 | Wegelin et al. |

FOREIGN PATENT DOCUMENTS

| | | |
|---|---|---|
| CN | 203482916 U | 3/2014 |
| CN | 203957668 U | 11/2017 |

OTHER PUBLICATIONS

Safetec of America, Inc.; Instant Hand Sanitizer Manual and Auto Dispensers (Fresh Scent); retrieved Dec. 4, 2017; https://safetec.com/portfolio_item/instant-hand-sanitizer-dispensers-fresh-scent; Saftec of America, Inc.; US.

Steris; Hand Sanitizers and Soap Dispensers; retrieved Dec. 4, 2017; https://www.steris.com/healthcare/products/hand-hygiene-solutions/hand-sanitizer-and-soap-dispensers/; Stersis plc; Leicester; UK.

Staples; Finger Pads & Moisteners; https://www.staples.com/Finger-Pads-Moisteners/cat_CL141635; retrieved Dec. 4, 2017; Staples, Inc.; US.

Amazon, Inc; Lee 10050 Sortkwik Fingertip Moisteners, 3/8 ox, Pink; retrieved Dec. 4, 2017; https://www.amazon.com/Sortkwik-Fingertip-Moisteners-Ounces-10050/dp/B00006XY1N Amazon, Inc.; US.

Amazon, Inc.; Premium Quality Desktop Sponge Finger Money Damper; retrieved Dec. 4, 2017; https://www.amazon.com/Premium-Quality-Desktop-Sponge-Finger/dp/B0038QZTGI; Amazon, Inc; US.

Sortwik; Hygienic Fingertip Moistener; no month, 2010; http://www.leeproducts.com/Sorting_Sortkwik.aspx; Lee Products Inc; Minneapolis, MN.

The Magic Café; blog post by DWRackley; retrieved Dec. 4, 2017 http://www.themagiccafe.com/forums/viewtopic.php?topic=405975&forum=41; Steve Brooks; US.

Livejournal; Natural Living; Natural Alternative to Tacky Finger; retrieved Dec. 4, 2017; http://naturalliving.livejournal.com/1863965.html; Sup Media, LLC; Moscow; RU.

Pickering Laboratories; Artificial Saliva; retrieved Dec. 4, 2017; http://www.pickeringtestsolutions.com/artificial-saliva; Pickering Laboratories, Inc.; Mountain View, CA.

Amal at al; Preparation of Artificial Saliva Formulation; Pharmaceutical Technology; Proceeding—IBC Pharma II; "Current Breakthrough in Pharmacy Materials and Analyses"; ISSN: 9-772476-969006; at least as early as Dec. 2017; UBM plc; London, UK.

Google; search results for "Simulated Salivary Fluid Preparation" retrieved Dec. 4, 2017; https://www.google.co.in/search?q=salivary+simulated+fluid&ie=utf-8&oe=utf-8&client=firefox-b&gfe_rd=cr&ei=tbg3WMn4AfLI8AfJk5HIAg#q=simulated+salivary+fluid+preparation; Google, Inc.; US.

B.W. Darvell; The Development of an artificial saliva for in vitro amalgam corrosion studies; Journal of Oral Rehabilitation, 1978; vol. 5. pp. 41-49; John Wiley & Sons, Inc; Hoboken, NJ; US.

Marques et al; Simulated Biological Fluids with Possible Application in Dissolution Testing; Dissolution Technologies; Aug. 2011; pp. 15-28; dx.doi.org/10.14227/DT180311P15; ResearchGate GmbH; Berlin, DE.

Pesticide Environmental Stewardship; Understanding Droplet size; retrieved Dec. 4, 2017; https://pesticidestewardship.org/pesticide-drift/understanding-droplet-size/; Center for Integrated Pest Management; Raleigh, NC.

(56) References Cited

OTHER PUBLICATIONS

American Society of Agricultural and Biological Engineers (ASABE) droplet size classification system (ASABE S-572.1); no date; retrieved Dec. 4, 2017; St. Joseph, MI; US.

Abcecosol.com; Manual Dispenser; retrieved Dec. 4, 2017; http://abcecosol.com/product/manual-dispenser/; ABC ECO Solutions, LLC; Stockbridge, GA; US.

Abcecosol.com; shopping page; retrieved Dec. 4, 2017; http://abcecosol.com/shop/; ABC ECO Solutions, LLC; Stockbridge, GA; US.

Abcecosol.com; shopping page; retrieved Dec. 4, 2017; search results for Dispenser Stand; http://abcecosol.com/product/dispenser-stand/; ABC ECO Solutions, LLC; Stockbridge, GA; US.

Su et al; A novel micropump droplet generator for aerosol drug delivery: Design simulations; Nov. 19, 2010l U.S. National Library Of Medicine National Institutes Of Health; US.

* cited by examiner

FINGERTIP MIST

CROSS-REFERENCE TO RELATED APPLICATION

This application claims the benefit under 35 USC 119(e) of U.S. Provisional Application No. 62/602,116, filed Apr. 12, 2017, which is incorporated herein by reference.

FIELD OF THE INVENTION

This invention relates to apparatus and methods for delivery of fluids as distributed droplets of relatively fine mist to fingertip in lieu of substantially concentrated volume liquid, where such mist facilitates opening of produce bags, counting of money, separation of papers and other applications where mist treated fingertips are useful. This invention also relates to a clean, sterile mist of simulated saliva as a substitute for natural saliva to avoid spread of 'germs' from one consumer to others. This invention avoids consumers passing germs by use of their own germ laden saliva to open produce bags, count money, separate pages of papers, and the like, by enabling use of a substitute fluid for human salvia

DETAILED DESCRIPTION

Currently, many consumers are focused on eating healthier, which results in their buying more fresh produce such as fruits and vegetables.

Food stores such as grocery, convenience stores, and farmers markets (including many international) offer their customers very thin plastic "produce bags" to collect and bag produce, but also as a means to separate, and transport to checkout different types and amounts of various produce. For example, a customer purchasing different varieties of red apples may save checkout time by segregating into separate bags selections of differing weights or number counts of Red Delicious, Gala, Wine-sap, Rome and the like.

For dispensing, produce bags are normally tendered as an efficient "narrow (about 4 to 7 inches wide) layers with flat and near rectangular profile" and thin (about 5 to 10 microns thick) plastic bags on rolls of several hundred bags per roll to help maximize shelf and display space. The bags are made thin to reduce waste. Each individual bag is perforated from the leading and following bag for removal from the roll by pulling on the selected lead bag across a point tear mean and separating it from the next following bag remaining on the roll. Many such bags are printed with pointed arrows that direct users to the opening end versus the sealed end. Commercially available examples include those high-quality bags available from Inteplast Group of Gray Court S.C., such as NP14X18MM Fresh 4 You 14"×18" Natural Translucent Narrow Profile Plastic Produce Bag with More Matters Graphic—3000/Case Item#: 130PBN1418MM MFR#: NP14X18MM Many such very thin produce bags are made of plastics such as polyethylene (of various high density, linear low density or low density) which retain significant surface tension, or processing resulting adhesion between layers, holding the layers of each bag firmly together making initial separation of the bag layers very hard, thus opening of the bag is difficult.

When at the market, consumers become frustrated with lack of moistened fingertips for use with opening of hard-to-open produce bags supplied by the merchants. Therefore, consumers moisten their fingertips with their own saliva, and then touch various produce during their selection process, thereby leaving behind bacteria and other germs.

That is, many frustrated consumers 'lick their fingers' to moisten them to create a means to break the bag layers. That is a long-standing problem because the customers may then pickup produce, spread germs from their saliva to such produce they touch, then reject it and return it to the display. A later consumer may then select the germ-laden produce and not wash before consuming.

There is thus a need to avoid consumers using their own natural saliva to moisten their fingertips during shopping and touching produce and other products and thereby spreading 'germs'. There is also a need to avoid consumer frustration by better enabling them to moisten fingertips to open such hard-to-open produce bags.

In addition, there is also continuing need for improved fingertip moistening for counting of money, separation of papers, and other instances where moist fingertips are needed and where passing along germs from human saliva used for wetting is to be avoided.

Some food stores offer bottles, tubes or dishes of pastes or lotions (water or oil based) or alcohol based hand sanitizer gels. Other stores have offered fingertip moistener pads, sponges, roller balls, or other open containers of creams, which are also otherwise used for money counting however such require sharing by different customers of the same contact touch surfaces, thus enabling spread of germs.

Certain other food stores may offer manual hand pump dispensers of such lotions or gels or automatic electrically dispensers of same. For automatic dispensers, prior art infrared or motion-type sensor examples can be derivatives of U.S. Pat. No. 8,975,819 B2 to Hendrikas et al and U.S. Pat. No. 8,878,663 to Katiba et al. or small object sensing by adaptation of large space and other passive infrared motion detectors such as those of U.S. Pat. No. 6,215,399B1 to Shpater, US 20040140430 to Micko, and U.S. Pat. No. 9,531,420 B1 to Pendergast et al.

U.S. Pat. No. 6,386,390 to Tinker discusses a liquid dispenser having a container for a liquid, a vent opening to allow air into the container, having a control valve to control admission of air into the container, and a dispensing opening at the bottom from which the liquid is dispensed. When the valve is closed, a pressure differential is created that prevents the liquid in the container from flowing out. Upon opening of the vent valve, the pressure differential is reduced and dispensing occurs. Tinker discusses use of radiation from an emitter, which impinges on the hand and is reflected to a detector. Upon sensing the reflected radiation, the detector causes the valve for the vent tube to open so that the pressure differential in the container is eliminated and the liquid can be dispensed. When hand is not sensed, the valve closes.

The liquids' dispenser system of U.S. Pat. No. 9,264,383 to Yang et al, assigned to Simplehuman LLC discusses use of alternative sensors which they contend require far less power than infrared or motion-type sensors to trigger pump actuation systems for delivery of liquids. Examples discussed include sensor devices having a beam of light from a light emitting and receiving portion, which is interrupted by hand as trigger or use of a low power beam of light, which is continuous or intermittent, and which may or may not be visible to the human eye, to power the light. Also discussed sensors are those operated in a pulsating mode where light emitting portion can be powered on and off in a cycle such as, for example, for short bursts lasting for any desired period of activation time at any desired activation frequency, as disclosed therein A longstanding problem which such prior art dispensers such as Tinker, Yang et al. and others is that they do not deliver mist, but instead deliver undistributed, not well dispersed, liquid streams, in context of substantially constant concentrated volumes of streams, wads, globs or clumps which are acceptable for soaps for hand washes. For bag opening, counting money, or separating of papers, an undistributed liquid stream, clump or 'wad' or 'glob' of liquid delivery to the customer's hands is not desirable and is wasteful, and also not effective in bag opening or counting money or the like. There is simply too much liquid delivered to be effective for layer separations, when a significantly lesser quantity is best.

What has long been needed is a simulation of the 'lick the fingers' level of 'saliva type' fluid moisture delivery to customers' fingertips for layer separations.

In the prior art, 'artificial saliva' is prepared for many medical and dental uses, for illustration, (i) testing a wide variety of products, including testing biodegradability dental metal alloys, (ii) pharmaceutical research such as studies of drug dissolution and drug delivery through oral mucosa, (iii) testing of products for corrosion, colorfastness and discoloration when taken into the mouth, (iv) dissolution of food and drug components when placed in the mouth and (v) commercially available compositions used to treat dry mouth and other conditions. The pH of such solutions can range from about 6.5 about 7.4, or other scope, including many available from Pickering Laboratories, Mountain View, Calif.

For example, artificial saliva prepared according to AFNOR NFS91-141 standard procedure is intended for testing biodegradability of dental metal alloys. Artificial saliva prepared according to DIN 53 1601:2010-10 standard procedure is used in methods to determine colorfastness of products intended to be taken into the mouth per DIN 53160 specified methods.

However, certain of such artificial saliva so formulated in the prior art which are 'ready to use' are formulations that should be stored refrigerated or formulations, typically consisting of two or more parts that are mixed right before use, some of which are best stored frozen both before and after mixing, and are not suitable for use in non-refrigerated food store displays.

A long felt continues for low cost simulated saliva, as opposed to high cost prior art medical and dental applied artificial saliva, to avoidance of use of human saliva in food, money and other finger contact situations Also continuing is a long-felt need for a dispenser that optimally dispenses to a fingertip a mist in a minimal amount of output effective for surface layer separation, in lieu of dispensing larger quantities of undistributed liquids for hand soap wash or hand sanitization,

BRIEF SUMMARY OF THE INVENTION

I have found that a range of selected fluids when converted to distributed mist, in contrast to and opposite to undistributed concentrated streams, globs, wad or the like, fulfills consumers' long felt need for small quantities of droplets, when correctly dispersed as light mist to fingertips, facilitate layer separations, such opening of produce bags, in an efficient manner and avoids use of their human saliva and spread of germs.

I have also found that this invention facilitates money counting, where layers of bills tend to stick and some proper amount of distributed fluid facilitates separation of one bill from another. This invention further facilitates separation of pages of paper such as those reading novels, newspapers or handling stacks of drawings, legal documents and other papers.

In addition, I have found a way to make simulated saliva and apply to a different use as a mist, with a focus on preferential use of sterile or natural mist media selected to avoid causing adverse sensations of burning to eyes or skin. One advantage of this invention is that is not necessary to protect the produce from touch because of the type and minor amount of the sterile simulated saliva does not excessively contaminate the produce. For uses in counting money and other papers, contamination with minor amounts of sterile mist media is not an issue either. The term "fingertip" or "fingertips" as used herein means the skin surface of the last joints of at least one finger of one hand, but not to all of the hand, and the counter of the last joint the thumb or in the case where no thumb is available or used, the counter pressure between two adjacent fingers on one hand or fingers of opposite hands, or other functional equipment body parts to separate layers of plastics, paper and the like. Also within "fingertip" is dispensing mist to the palm or other portions or tops or sides of the hand, followed by fingertip touch to the misted area; however, such indirect application may not be as efficient or effective as direct fingertip contact for minimal fluid mist use.

The term "mist" as used in the Specification and Claims means collection of distributed tiny droplets issued from a mister forming a spray and/or foam resulting from a mist generator such as tailored single hole or multi-hole nozzle distributor or ultrasonic mister, said mist having a texture in the context of a physical feel of a light drizzle, cloud, haze or fog. In one variation, "mist" means collection of distributed droplets with sizes per classification system ASABE S-572.1 of American Society of Agricultural and Biological Engineers (ASABE) from extremely fine (XF) to ultra coarse (UC) based upon droplet size spectrum values for spray quality measured in microns.

For mist generation, preferably in selection of nozzles orifices of a mister, nozzles are selected so as to produce a mist having a ASABE S-572.1 droplet category from extremely fine (XF, 60 microns or less) to ultra coarse (UC, greater than 650 microns yet remaining in droplet not stream form). More preferably nozzles are selected to product mist in the range of extremely fine (XF, 60 microns or less), very fine (VF, 60 to 145 microns) to fine F (225 microns or less).

The term "light mist", as used herein mist media droplet size and quantities sufficient to reduce dryness of fingertips to enable layer separation, but in a quantity less than that threshold which forms a liquid flow stream, glob or other relatively large mass.

I have found it is important to determine use of minimum or targeted very low levels of mist media in dispensing distributed fluid contact to a solid such as a fingertip for layer separation applications such as grocery bags, money counting. Dispensing distribution as droplets is preferable versus that as liquid streams, globs or other relatively large masses.

In this variation of this invention, for dispensing a targeted minimal effective amount of fingertip mist for layer separation, I have found preferable to adapt these principles in dispenser design for 'mist output' over 'stream output', in balancing mist output for use of only minimal amount of mist: (1) increases in angle of contact of droplets off vertical contact for a given area of fingertip surface, decreases wetting or coating, (2) decrease in specified size of spray droplets for a given quantity of feed to a nozzle zone increases the number of droplets of output, and (3) increase of specified droplet diameter results in a non-linear relation to volume and/or weight of output dispensed.

For illustration of (1), since fingertip surfaces are rounded, not flat, the nozzle output distribution should address finger surface rounding, by directing more vertical droplet output to a focused zone of the fingertip which is less than the entire surface area of the fingertip or by making nozzle output curved, not flat, to produce an angular output which corresponds generally to fingertip surface.

For illustration of (2), prior art soap dispensers are designed for hands, of which fingertips are part and dispense when any part of the hand is sensed or otherwise involved in trigger. However, for dispensing minimal effective amount of mist for layer separation, I have found that sensing is best reduced to just one or a few fingers (not entire hand), and preferably reduce to sensing one finger, to which minimal mist is dispensed.

For illustration of (3), with a base droplet of 150 microns within ASABE category F, or Fine category, doubling size to 300 microns within ASABE M, or Medium category, increases the weight and/or volume of dispensed simulated saliva about eight (8) times. Opposite thereto, changes in volume of liquid flow feed through a typical single output orifice for dense liquid dispensing does not see same multiplier as mist media forming nozzle and instead sees more proportional behavior of single dense liquid stream output in response to amount fed and dispensed than misted media.

As used herein, the terms "undistributed" versus "distributed", "dense" versus "dispersed" and "substantially constant or concentrated volume" versus "non-constant or broadcast volume" refer to a view of a selected small reference cubic volume having equal sides, such as for example, a cube 0.25 cm on each side. For mists, wherein droplet size output or fog distribution may vary based on feed pressure and orifice sizes and shapes and other features such as feed material surface tension and viscosity, the reference volume is not always constant. For liquids at given conditions, such reference volume is substantially a constant volume. Then when compared to mist comprising droplets having a potential somewhat random or non-constant variable spray pattern, liquid reference volume components are undistributed, being generally aggregated.

Since non-linearity applies in droplet mist spray formation as a distributed output of a dispenser, opposite to more linear flow behavior of prior art dispenser output of dense liquid, I have discovered a need to adapt and improve prior art dense liquids dispensing systems such as that of U.S. Pat. No. 9,264,383 to Yang et al, assigned to Simplehuman LLC Human for dispensing of distributed mist droplets.

Since prior art soap dispensers failed to recognize need for mist, I have further discovered a need to modify or convert prior art soap dispenser devices such as Yang et al. to enable mist formation by use of simulated saliva, instead of soap per Yang et al. and other prior art dispensers. Such dispenses also do not contemplate delivery of novel simulated saliva disclosed first herein and which generally will have different surface tensions and viscosities than soap. For illustration, in U.S. Pat. No. 9,265,383 for "Liquid dispensing units", Yang et al state that their discharge assembly includes a discharge nozzle, such as a flap-type nozzle where the size and configuration of the discharge nozzle can be determined to provide the appropriate flow rate and/or resistance against flow of liquid soap from their pump. A flap-type nozzle does produce mist. Yang et al completely failed to recognize or teach the need for mist generation needed for droplet formation and dispensing of distributed mist droplets of fluid versus dispensing substantially constant volume dense liquid, where volume means comparative reference volume per cubic reference area of mist over liquid.

In dispensing mist over liquid, I have found that the preferred mist is simulated saliva which has a stickiness, thickness feel, and/or wetting feel over water alone and behaves like, or similar to, natural human saliva, not water alone.

I have found that I can make simulated saliva as an all-natural material; however minor amounts of preservatives and other processed additives can be used if they do not detract from characteristics herein described. Such natural material preferably comprises a water base and additives of naturally occurring materials or extracts or derivatives thereof, such as citrus extracts or oils of lemons, grapefruit, oranges, olives, peanuts and others, as well as cellulosic materials and other plant matter as described further herein. Thus, the contact medium in one basic variation is water, with natural materials or derivatives thereof, added to lend desired level of stickiness (also referred herein to as tackiness) and/or to attract moisture and/or increase viscosity for texture increase over water alone.

Thus, preferred formulations of simulated saliva have, as compared to water alone, an increased tackiness, viscosity and surface adhesion 'stick-to-it' wetting characteristics, as well as level of moisture attraction to the skin of humectant-type characteristics, over water alone as the surface contact medium mist. Use of formulated simulated saliva as described herein is thus a preferred embodiment of this invention, even though water, if properly misted is within the scope of simulated saliva for this invention. That is, water alone can be used as the misting fluid if properly distributed as mist droplets in minor amounts to mix with natural oils on surfaces of fingertip and counter rubbing thumb, but preferably not in large quantities such as a liquid stream which will wash away minor amounts of naturally occurring skin surface oils.

I have found one basic preferred variation of formulation of simulated saliva comprises water as base, with effective amounts of (i) added tackifier such as citric acid including citrus extracts from lemons, grapefruit, oranges and other citrus added in to make mist contacted fingertip to feel at least slightly sticky and (ii) optionally added humectant, to attract moisture to the skin of the fingertip such as various glycerins, including vegetable glycerin, as well as aloe, honey (also serving as tackifier), or cultured hyaluronans and (iii) also optionally added, thickeners such as xanthum gum and minor amounts of olive oil.

Various tackifiers, humectants and thickeners are well known in the art and are useful in this invention to make a more viscose, tacky, and moisture attracting solution or suspension with water, over water alone, to improve separation of bag layers, money or paper layers and the like. Certain prior art simulated saliva formations can be stored at room temperature and are available as ready-to-use solutions containing a form of carboxymethyl cellulose or cellulose gum or tylose powder which is a cellulose derivative used to increase viscosity of a water based solution, make it tacky, viscous, moist and make it behave similar to natural human saliva. Also, tackifiers and thickeners useful in this invention include byproducts of starch extracted from corn, wheat, potatoes and peas are likewise useful and are supplied by many including Roquette Freres, with offices in Lestrem, France.

In addition, I have also found the following are useful variations of mist-forming simulated saliva: (a) accepted commercially available fruit and vegetable cleaners tested to ensure that concentrations of surfactants and cleaning agents do not negatively detract from tackiness and humectant characteristics needed during use as a simulated saliva for mist generation and (b) less desirable yet still effective, spray-able compositions comprising zinc oxide.

DETAILED DESCRIPTION OF THE INVENTION

Figure 1:
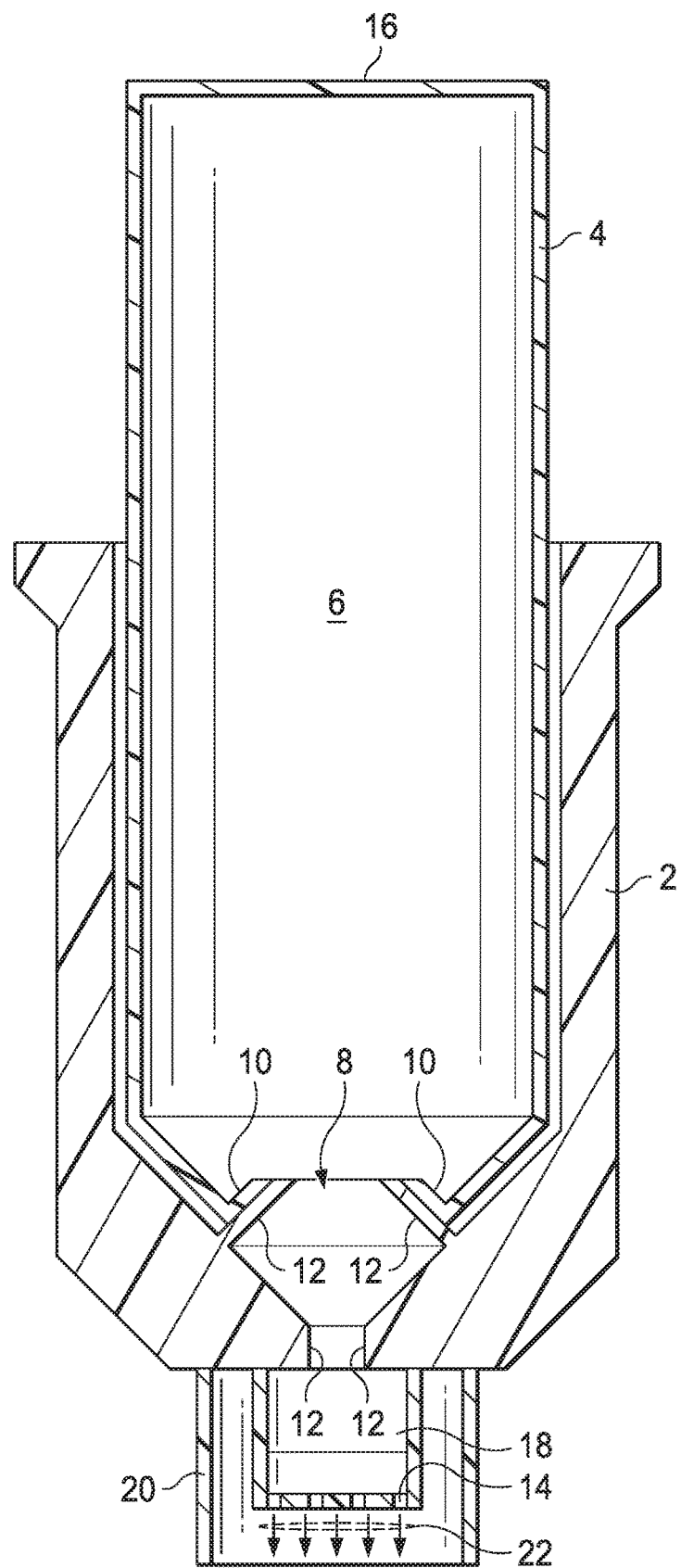
FIG. 1 is a schematic drawing showing basic apparatus and process steps of forming a mist of simulated saliva for delivery to fingertips.

This invention provides a simulated saliva, for use as a substitute for germ laden human saliva, effective to separate one layer of separable material from another layer of same material and provides apparatus to dispense mist of such simulated saliva and methods for use of such mist of such simulated saliva in layer separations.

In a preferred embodiment, simulated saliva comprises water with one or more texture additives to impart to water, as contact medium preferably between end zone of thumb and fingertip, a texture that feels of stickiness, thickness and/or surface wetting akin to that of human saliva, wherein one or more of said additives are selected from the group consisting of one or more of a (i) tackifier, (ii) viscosity modifier and (iii) humectant. In one variation of this embodiment, such texture additives are all natural materials or derivatives thereof wherein (i) tackifiers are selected from the group consisting of diluted citrus extracts or oils of lemons, grapefruit, oranges and other citrus, diluted honey and diluted oils of olives, peanuts and corn, (ii) viscosity modifiers are selected from the group consisting of xanthan gum from fermented sucrose, glucose or lactose or other sources and/or modifiers from byproducts of starch extracted from corn, wheat, potatoes and peas, and (iii) humectants are selected from the group consisting of aloe, honey, cultured hyaluronans, and various glycerins, including vegetable glycerin. In one variation, carboxymethyl cellulose or another version of cellulose gum, tylose powder and other cellulose derivative is present as texture additive in an amount to modify texture of water to feel like saliva In a less preferred embodiment, simulated saliva is water alone, however when minor amounts of water droplets are properly distributed as mist to fingertip to enable droplet mix on fingertip, preferably by rub of water droplets by thumb against one or more fingers, with naturally present finger surface oils to cause behavior like very minor amounts of human saliva. The water base is preferably sterile, but such is not required in all applications.

In an alternative embodiment, commercially accepted water based fruit and vegetable cleaners are suitable for use as simulated saliva, preferably when concentration level of surfactants and cleaning agents within commercial fruit and vegetable cleaners are low enough to leave such cleaners with suitable tackiness, viscosity and humectant characteristics to enable layer separation. In one variation, examples of commercially accepted available fruit and vegetable cleaners include (i) Eat Cleaner Fruit and Veggie, available from Grow Green Industries, Inc. Aliso Viejo, Calif., which is reported to comprise purified water, citric acid, sodium citrate sea salt, vegetable glycerin, calcium ascorbate, and decyl glucoside and (ii) Better Life Fruit & Vegetable Wash, available from Better Life Organics, Los Angeles, Calif., which is reported to comprised of a blend of citrus extracts, natural cleaning agents and minerals.

In a different embodiment, sprayable compositions comprising zinc oxide can be used as simulated saliva when concentration level of zinc oxide is presence at a concentration below that which plugs nozzles of mister. In one variation, a potentially usable, assuming used in minor amounts, are high zinc oxide content compositions, where such zinc oxide content does not exceed an amount that plugs spray nozzles and one example thereof is Blamtastic Booty Spray available from BlamCo LLC, Atlanta Ga., which reportedly comprises water, zinc oxide (~12%), caprylica/caprictriglycerides, polyhydroxy steric acid, cococaprylate, glyceryl oleate citrate, phenoyethanol, capryl glycol, steric acid and xanthum gum.

A less desirable embodiment because of dilution of natural fingertip oils, yet still modestly effective, is use as simulated saliva of minor amounts of mist comprising an ethanol based hand sanitizer, when droplets are properly distributed as mist on the fingertip to enable mix with naturally present finger and thumb surface oils to cause surface behavior like very minor amounts of human saliva. An example of such sanitizer is 'germX' distributed by Vi-Jon, St. Louis, Mo.

In one embodiment of this invention, a method to separate one layer of separable material from another layer of same material is provided by distributing droplets of a selected limited or minimum quantity of simulated saliva in the form of a mist to one or more fingertips, either with counter contact by opposing thumb to the mist to also wet a portion of the thumb before contact of misted fingertip to one layer of separable material or by leaving the thumb dry for contact with one layer of separable material while at least one misted fingertip surface contacts the opposite layer.

In one variation of a method of this invention, the mist dispensing is by insertion of a non-pressurized or pressurized container, which serves as supply reservoir of simulated saliva into a receptacle having a receiver for receiving the container. To prevent spillage if the container is inverted before insertion into the receiver, the connector may have a seal at its output end, which seal can be broken by cutting means positioned on portion of the receiver when the container is pressed against the cutting means or broken by other means of engagement of the container and connector with the receiver that enables cutting. Another variation, for example, of container capable of inversion is that used with commercially offered dispensers, is container product Total brand sanitizer refill, SKU ABSHS003 from ABC Eco Solutions, Pittsburgh, Pa. or Artemis BioSolutions, Elkhurst, Ill.

In a variation, simulated saliva passes from container through the receiver to motive operator mean such as a pump, which pumps or otherwise forces the contents of the container through a mister, preferably a multi-hole nozzle or other comparable spray nozzle to form mist for one or more fingertips in said sufficient quantity for said material separation. In a specific variation, a finger sensor senses presence of a fingertip and directs control signal to pump operation means to cause a selected limited flow said simulated saliva from said container through said mister to form a mist. In other variations, placement of the receptacle near produce bags in grocery story, bank counter areas, and other locations where mist is needed is facilitated by pre-existing fixtures for wall or other surface mount selected from the group consisting of (i) mount plate on receptacle adapted for receiving screws (ii) magnetic mounts and (iii) commercially available snap in place lugs and inserts on mount surface, with corresponding lugs and inserts on receptacle.

FIG. 1 gives a general overview of one embodiment of this invention and shows in simplified form the major components of an apparatus to form a mist (22) of simulated saliva for delivery of said mist to fingertips in a quantity sufficient to separate one layer of separable material from another layer of same material. In FIG. 1, said mist generating apparatus comprises container (4) holding a reservoir (6) of said simulated saliva, said container having a connector (10) with an exit conduit (8) to pass said simulated saliva from said container, and having a container end (16) opposite said exit conduit (8). The apparatus also comprises receptacle (2) for receiving said container to fix its location, said receptacle (2) having a receiver (12) to receive said connector (10) of said container (4) of simulated saliva when said container (4) is inserted into said receptacle (2) and correspondingly when said connector (10) is inserted into said receiver (12), said simulated saliva is enabled to pass from said container (4) through said exit conduit (8) and through said receiver (12) to operations means (18). Said operation means (18) is preferably connected to said receiver (12) to enable receiving input of simulated saliva from receiver (12) and directing output through mister (14) to form mist (22), and (d) fingertip sensor (20) operably connected to said operation means (18) to cause, when sensor is activated, said output of simulated saliva from operation means (18) to pass through the mister (14) to form said mist (22) for distribution of droplets to fingertip in sufficient quantity for use in said material layer separation. The apparatus enables mist to be dispensed to fingertips in droplet form of select limited size and minimum quantity sufficient to enable separation of one layer of separable material from another layer of same material and wherein said separable material is selected from the group consisting of a (i) produce bag comprising at least two layers for layer separation to open said bag, (ii) stack of money in layers for layer separation to enable counting of said money and (iii) collection of paper in layers for layer separation to enable removal of one or more papers from said collection. If the container (4) is not on purpose pressured container, then a suitable point such as the end opposite (16) exit conduit (8) may be vented to assist in exit flow of simulated saliva.

In a variation of FIG. 1, exit conduit (8) of container (4) is covered with a perforable thin seal of paper, plastic film, thin metal or composites (not shown) such as those used to seal, under removable caps, unopened ends of milk, juice and other liquid contains. First, when the container (4) is inverted, the seal prevents flow of simulated saliva out of the container, then when the container (4) connector (10) is pressed downward against the receiver (12), the seal is broken, cover is cut or passageway opened by alternative means known in the art, to allow flow of simulated saliva into receiver (12). That is, exit conduit (8) of connector (10) comprises, prior to insertion into said receiver (12), an unperforated end cover that prevents flow of simulated saliva from container (4) when container (4) is inverted, which end cover is perforated by perforation means positioned with receiver (12), said perforation occurring when said container (4) is fixed in said receptacle (2) and said connector (10) is fixed in said receiver (12).

In FIG. 1, the operation means (18) is selected from the group consisting of (i) electrical power-driven pump activated by push bar or push button activated sensor (20) control device, (ii) mechanical power-driven pump activated and driven by manual push pressure sensor (20), and/or (iii) a pressurized container (4) release of pressure motive power activated by electrical or manual push pressure sensor (20).

In one variation shown in FIG. 1, the operation means (18) is activated by manual press bar as sensor (20) to cause compression pressure to pump simulate saliva fluid from receiver (12) through said droplet generator (14) to form mist (22). One variation manual compression is by a micropump droplet generator activated by manual press bar (20) to cause compression pressure to pump simulate saliva fluid from receiver (12) through said multipump droplet generator to form mist. Suitable micropumps include, but are not limited to, mechanical versions or electrically driven models of variations of that valveless micropump described in "A novel micropump droplet generator for aerosol drug delivery: Design simulations by Su et al published 2010 by US National Library of Medicine National Institutes of Health.

In another variation, the container is in the range of about 8 to 10 inches tall, and capable of holding about 12 to 14 ounces of fluid media to be misted and the receptacle (2) has a wall thickness of about one quarter centimeter (cm) and a height sufficient to fix the location of, avoid spillage or fall of the container (4). Other sizes, shapes and configurations can used without departing from scope and spirit of the invention.

Figure 2:
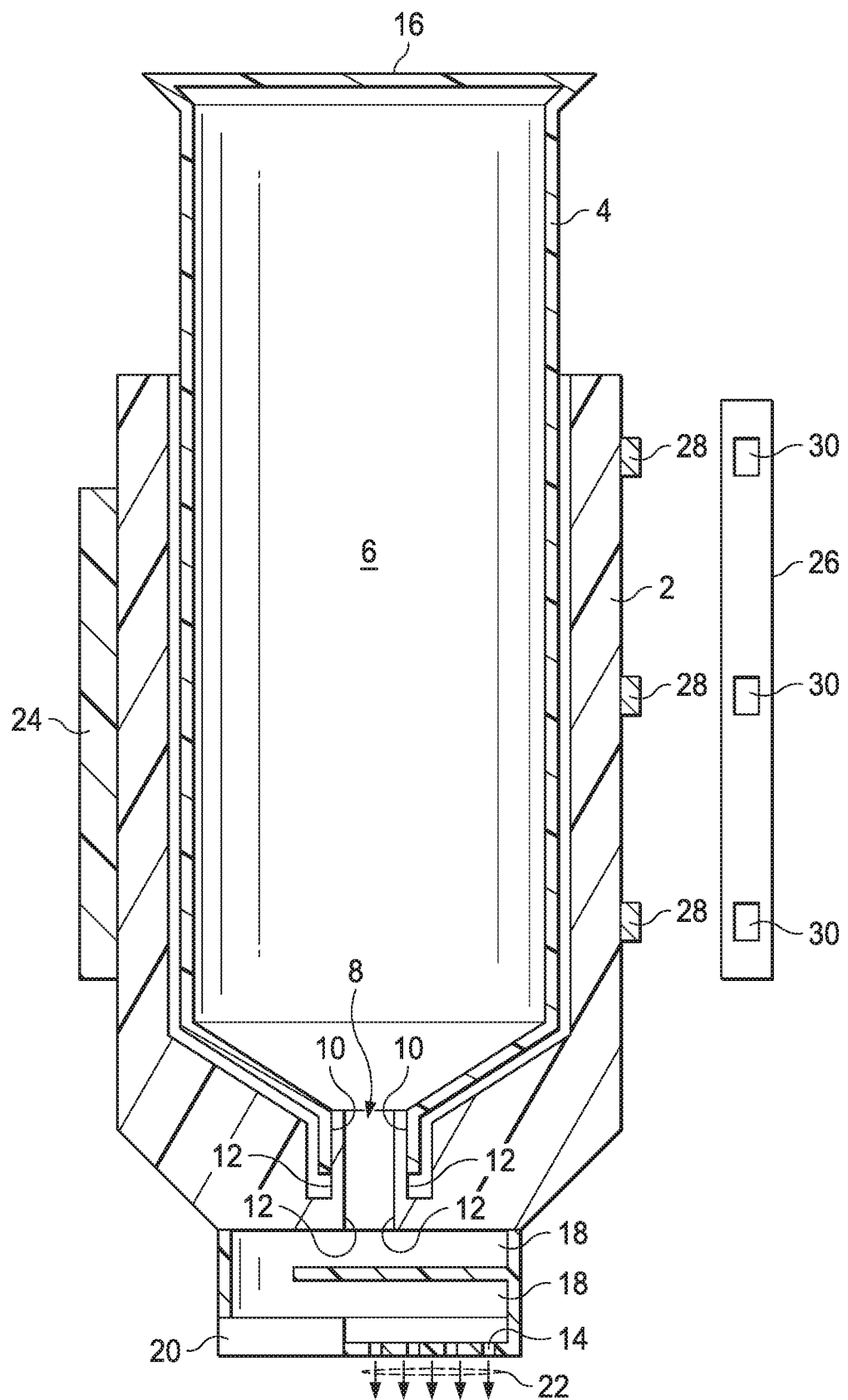
FIG. 2 gives a general overview, which shows in simplified form, the major components of another embodiment of a fingertip mist dispenser.

In FIG. 1, the container (4) end opposite (16) said exit conduit (8), is removable, such as a snap-on end cap or screw on cap or other removable and replaceable covers, for refilling with simulated saliva and reusable for sealing as a closure end of container (4) after refilling. Also, although FIG. 1 shows space, for ease visualizing and understanding, between wall of receptacle (2) and container (4) such space may very nominal or at a minimum clearance needed for insertion or removal. Furthermore, the interface of said connector (10) with said exit conduit (8) and said receiver (12) may seal sufficiently to prevent leaks of simulated saliva from said container (4). To reduce or prevent corrosion, said interface is preferably comprised of plastics, elastomers, noncorrosive metals or other corrosion resistant materials Whilst FIG. 1 is illustrative of embodiment of this invention wherein a portion of the receiver (12) protrudes into the container (4), FIG. 2 is illustrative of an embodiment wherein both (i) the container (4) connector (10) protrudes into the receiver (12) and a portion of the receiver protrudes into container (4) outlet (8), The protrusion of the receiver (12) can cut any seal on the outlet end of the container connector (10) and the interface between container connection (12) and receiver (12) can contain 0-rings and other sealing means to prevent leaks and corrosion. In the variation shown in FIG. 2, the operation means (18) such as pump has a low-pressure input suction section to which simulated saliva (8) from container (4) is drawn and a high-pressure output section operably connected to mister (14) to generate mist (22) when sensor (20) is activated. In a variation shown, container end (16) opposite said exit conduit (8) or an outer wall (24) of receptacle (2) comprises a waterproof battery compartment with replaceable or rechargeable batteries and wire leads which supply power to an electrically driven operation means (18), or alternatively said operation means (18) is operated by electrical power supplied by line voltage, either direct or converted to low voltages lower than line. FIG. 2 further illustrates surface or wall mount (28) wherein placement of said receptacle (2) is facilitated by pre-existing fixture (28) for wall or other surface mount attachments (30) selected from the group consisting of (i) mount plate on receptacle adapted for receiving screws, (ii) magnetic mounts and (iii) commercially available snap in place lugs and inserts on mount surface, with corresponding lugs and inserts on receptacle.

In one or more embodiments of this invention, a mist generator is used to break up a concentrated fluid steam or dense bulk fluid flow into dispersed droplets for application to fingertips for layer separations. In variations, one or more misters are preferably selected from the group consisting of (i) high pressure fluid output through single-fluid orifice or collection of single-fluid orifices, (ii) pressured spray with pressured air as motive force, and (ii) atomization to form mist by ultrasonic spray device, and other misters can function well with reasonable adaptions those skilled in the art can make having by this invention after receiving the teachings herein.

In variations of misters of this invention, familiar atomization principles must be scaled down and adapted at a small scale for mist generation for fingertip treatment. For example, those macro-sized spray principles used in shower heads, agricultural sprayers and perfume, deodorant or hair sprayers and which convert undispersed fluid flow to a spray collection of moving droplets with either relatively uniform sizes or a variety of droplet sizes within the spray, must revised when applied to micro-sized fingertip mist.

I have found that issues with a variety of factors affect spray droplet formation and size, including fluid properties among many of which are viscosity and surface tension, are magnified when mist or micro-droplets are desired. Surface tension tends to stabilize a fluid, preventing its breakup into smaller droplets, as is well known in the art and includes various encyclopedia reported surface tension values (Newton/meter at 20° C.) such as (i) ethanol 0.022, (ii) olive oil 0.032 (iii) glycerin 0.063, (iv) water alone 0.073, whereby higher surface tensions fluids (among which is water) tend to have a larger average droplet size upon atomization. With somewhat similar condition in misting is that a higher viscosity fluid resists breakup, causing larger droplet size. For small quantities of mist, quick on-off release changes distribution over a fraction of a second.

In one variation of this invention, the mist generating nozzle is one or more single-fluid spray nozzles, such as a plain-orifice nozzle with one more orifices, which use the kinetic energy of the fluid to break it up into droplets, wherein as the fluid pressure increases, the flow through the nozzle increases, and the drop size decreases. In another variation, airless atomization is used for mist formation, whereby an operation means such as a pump generates high pressure and forces fluid through one or more orifices to produce high speed output, then friction between the fluid and surrounding air disrupts the fluid stream, breaking it into fragments initially and ultimately into droplets. This combination of operation means and one or more mister orifices converts fluid pressure to momentum as the fluid leaves the mister.

In different variation, an ultrasonic spray nozzle employing high frequency (for example in range of 20-180 kHz) vibration is used to reduce surface tension of fluid at output of operation means and make mist. Such ultrasonic devices are common in the prior art for mist generation for medical device inhalers.

In still another variation, air spray atomization is used for mist formation, commonly referred to aerosol in some instances where energy source is compressed air stored in same container as the fluid to be dispensed, wherein relatively low speed fluid from output is surrounded by a high-speed stream of air, then friction between the fluid and air accelerates and disrupts the fluid stream, resulting in droplet formation.

In one embodiment of this invention, a mist dispenser to dispense distributed droplet fluid mist in lieu of undispersed liquid stream, said dispenser comprises (a) a housing; (b) a reservoir configured to store a feed fluid; (c) a fluid passage disposed in the housing, the fluid passage having an inlet and an outlet; (d) a pump disposed in the housing, the pump having an opening disposed in a pump body, the opening in fluid communication with the reservoir, the pump configured to allow air disposed therein to pass through the opening; (e) a motor disposed in the housing, the motor configured to drive the pump, the pump configured to encourage a flow of fluid from the reservoir into the inlet and out of the outlet of the fluid passage; (f) a first sensor configured to generate a signal based on a distance between an object and the first sensor; and (g) an electronic processor configured to receive the signal from the first sensor and to determine a dispensation volume to be fed to said nozzle, the dispensation volume varying as a function of the distance between the object and the first sensor such that, as the distance between the object and the first sensor increases or decreases, the dispensation volume correspondingly increases or decreases, the processor further configured to control the motor to dispense approximately the dispensation volume of the liquid, and (h) a mister, operably connected to said outlet of said fluid passage to convert said dispensation volume of fluid, from an undispersed stream prior to mister, to disbursed droplets of distributed fluid mist. In one variation of this invention, the processor is further configured to control the motor to dispense dispensation volume of fluid at a pressure sufficient to convert said dispensation volume of fluid from an undispersed stream prior to mister to disbursed droplets of distributed fluid mist. In one variation of this invention, elements (a) through (g) may be selected from descriptions found in U.S. Pat. No. 9,264,383 to Yang et al.

In another embodiment of this invention, a mist dispenser to dispense distributed droplet fluid mist in lieu of undispersed liquid stream, comprises (a) a housing; (b) a reservoir configured to store a liquid; (c) a fluid passage disposed in the housing, the fluid passage having an inlet and an outlet; (d) a pump and a motor disposed in the housing, the pump configured to be driven by the motor to encourage a flow of liquid from the reservoir into the inlet and out of the outlet of the fluid passage; (e) a sensor configured to generate a signal indicative of a range between an object and the sensor, the signal increasing or decreasing as the range between the object and the sensor increases or decreases; (f) an electronic processor configured to receive the signal from the sensor and to determine a variable dispensation volume, the determined variable dispensation volume increasing or decreasing as the signal increases or decreases; the electronic processor further configured to energize the motor to drive the pump to encourage approximately the variable dispensation volume of the liquid to be dispensed out of the outlet of the fluid passage, and (g) a mister, operably connected to said outlet of said fluid passage to convert said dispensation volume of fluid, from an undispersed stream prior to mister, to disbursed droplets of distributed fluid mist. In one variation of this embodiment, the processor is further configured to control the motor to dispense dispensation volume of fluid at a pressure sufficient to convert said dispensation volume of fluid from an undispersed stream prior to mister to disbursed droplets of distributed fluid mist. In one variation of this invention, elements (a) through (f) may be selected from descriptions found in U.S. Pat. No. 9,264,383 to Yang et al.

Thus, the present invention has broad application to methods and apparatus to make mists for fingertip and for uses of such mists. Certain features may be changed without departing from the spirit or scope of the present invention. For illustration, not limitation, one preferred variation is for the device to be positioned near vertical with mister (14) positioned at the bottom, however, this invention can be configured so the device sits upright with mister (14) positioned at top or the device can be configured to be positioned horizontally on one side. In FIG. 2, the mister can be configured with a removable and replaceable pressurized aerosol container (4) is a can having exit conduit (8) extending from said can, with receiver (12) being a pass though of exit conduit (8) and having operation means (18) being pressure release valve from said can, and said fingertip sensor (20) is operated by fingertip pressure push. As another illustration, one preferred variation comprises an electronically controlled sensor (20) positioned by or near mister (14) where the sensor (20) senses presence of the fingertip to be treated. However, sensor (20) can be located where most convenient or lowest cost, for simple example, sensor (20) can be 'doorbell' type push button operated by one hand whilst holding fingertip of other hand under the mister (14) to easily position fingertip to be treated. In addition, the container (4) need not be a rigid cylinder or can but instead can be square, octagonal or other useful shapes and, if pressurization is not needed, can be a vented flexible plastic or rubber bag or bladder. Accordingly, the invention is not to be construed as limited to the specific embodiments or examples discussed but only as defined in the appended claims or substantial equivalents of the claims.

The invention claimed is:

1. A method to separate one layer of separable material from another layer of the same separable material by distributing droplets of a selected limited or minimum quantity of simulated saliva as a mist to fingertips, said method comprising:
   a. placing, in an area where a mist (22) is needed, a receptacle (2) having a receiver (12) for receiving a container (4) holding a reservoir (6) of said simulated saliva, said container having an exit conduit (8) and a connector (10),
   b. inserting said container into said receiver of said receptacle, whereby said connector is engaged with said receiver of said receptacle to enable passing said simulated saliva from said connector of said container from the exit conduit of the container through the receiver via an operation means (18) to a mister (14), and
   c. forcing by use of said operation means (18) with a finger sensor (20) a selected limited flow of said simulated saliva from said container through said mister to form the mist (22) for fingertips in a sufficient quantity for material separation.

2. A method in accordance with claim 1 wherein placement of said receptacle (2) is facilitated by pre-existing fixtures fora wall or other surface mount selected from the group consisting of (i) a mount plate on the receptacle adapted for receiving screws, (ii) magnetic mounts, and (iii) commercially available snap-in-place lugs and inserts on mount surface, with corresponding lugs and inserts on the receptacle.

3. A method in accordance with claim 1 wherein the operation means (18) is operated by electrical power supplied by line voltage.

4. A method in accordance with claim 1 wherein the operation means (18) is a pump having a low-pressure input suction section to which the simulated saliva (8) from the container (4) is drawn and a high-pressure output section operably connected to the mister (14) to generate mist (22) when the finger sensor (20) is activated.

5. A method in accordance with claim 1, wherein said separable material is selected from the group consisting of a (i) produce bag comprising at least two layers for layer separation to open said produce bag, (ii) stack of money in layers for layer separation to enable counting of said money and (iii) collection of paper in layers for layer separation to enable removal of one or more papers from said collection.

6. A method in accordance with claim 1 wherein the exit conduit comprises, prior to insertion into the receiver (12), an unperforated end cover that prevents flow of simulated saliva from the container (4) when the container (4) is inverted, wherein the end cover is perforated by perforation means positioned with the receiver (12), said perforation occurring when said container (4) is fixed in said receptacle (2) and said connector (10) is fixed in said receiver (12).

7. A method in accordance with claim 1, wherein said container (4) is refillable with added simulated saliva and a container end (16) opposite said exit conduit (8) is removable for refilling and reusable for sealing a closure end of container (4) after refilling.

8. A method in accordance with claim 1, wherein the container (4) is a removable and replaceable pressurized aerosol can having the exit conduit (8) extending from said can, with the receiver (12) being a passthrough of the exit conduit (8).

* * * * *